(12) United States Patent
Liu et al.

(10) Patent No.: US 10,904,932 B2
(45) Date of Patent: Jan. 26, 2021

(54) TUNNEL BINDING BASED COMMUNICATION METHOD AND NETWORK DEVICE

(71) Applicant: Huawei Technologies Co., Ltd., Guangdong (CN)

(72) Inventors: Jing Liu, Beijing (CN); Zhe Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/132,255

(22) Filed: Sep. 14, 2018

(65) Prior Publication Data

US 2019/0045562 A1 Feb. 7, 2019

Related U.S. Application Data

(63) Continuation of application No. PCT/CN2016/107505, filed on Nov. 28, 2016.

(30) Foreign Application Priority Data

Mar. 16, 2016 (CN) .......................... 2016 1 0150188

(51) Int. Cl.
 *H04L 1/00* (2006.01)
 *H04W 76/12* (2018.01)
 (Continued)

(52) U.S. Cl.
 CPC ........... *H04W 76/12* (2018.02); *H04W 28/06* (2013.01); *H04W 76/10* (2018.02); *H04W 76/22* (2018.02)

(58) Field of Classification Search
 None
 See application file for complete search history.

(56) References Cited

U.S. PATENT DOCUMENTS 6,915,325 B1 7/2005 Lee et al.
2003/0224758 A1* 12/2003 O'Neill ............... H04L 12/4633
 455/411
(Continued)

FOREIGN PATENT DOCUMENTS

CN 101572664 A 11/2009
CN 102006218 A 4/2011
(Continued)

OTHER PUBLICATIONS

N. Leymann et al, "GRE Tunnel Bonding", draft-zhang-gre-tunnel-bonding-01.txt, Oct. 9, 2015, 39 pages.
(Continued)

*Primary Examiner* — Clemence S Han
(74) *Attorney, Agent, or Firm* — Conley Rose, P.C.

(57) ABSTRACT

This application provides a tunnel binding based communication method and a network device. The method includes: transmitting, by a first network device, a service packet to a second network device using a first binding tunnel including a first tunnel and a second tunnel; and when the first tunnel is faulty or transmission quality of the first tunnel does not meet a preset condition, transmitting, by the first network device, a service packet to the second network device using a second binding tunnel including a backup tunnel of the first tunnel and the second tunnel. Therefore, if a tunnel in an original binding tunnel is faulty, a tunnel binding based high-bandwidth service continues to be provided using another binding tunnel constituted by a backup tunnel of the faulty tunnel and a fault-free tunnel. Compared with the prior art, this application can improve high-bandwidth communication reliability and user satisfaction.

20 Claims, 6 Drawing Sheets

(51) Int. Cl.
   *H04W 76/10*      (2018.01)
   *H04W 28/06*      (2009.01)
   *H04W 76/22*      (2018.01)

(56) References Cited

U.S. PATENT DOCUMENTS

| | | | |
|---|---|---|---|
| 2004/0017816 A1* | 1/2004 | Ishwar | H04L 12/467 370/395.53 |
| 2010/0226246 A1* | 9/2010 | Proulx | H04L 12/4633 370/228 |
| 2013/0044591 A1* | 2/2013 | Song | H04L 41/0663 370/228 |
| 2015/0295728 A1* | 10/2015 | Kadel | H04L 12/2874 370/235 |
| 2016/0380884 A1* | 12/2016 | Sarikaya | H04W 8/08 370/389 |
| 2017/0005830 A1* | 1/2017 | Zhang | H04L 12/4633 |
| 2017/0118081 A1* | 4/2017 | Rius I Riu | H04L 41/08 |
| 2018/0006832 A1* | 1/2018 | Heidemann | H04M 15/49 |

FOREIGN PATENT DOCUMENTS

| | | | |
|---|---|---|---|
| CN | 104704776 A | 6/2015 | |
| CN | 105657748 A | 6/2016 | |
| EP | 2728802 A1 | 5/2014 | |
| WO | 2006101668 A2 | 9/2006 | |

OTHER PUBLICATIONS

Foreign Communication From a Counterpart Application, Chinese Application No. 16894211.8, Chinese Office Action dated Nov. 11, 2019, 5 pages.

\* cited by examiner

TUNNEL BINDING BASED COMMUNICATION METHOD AND NETWORK DEVICE

CROSS-REFERENCE TO RELATED APPLICATIONS

This application is a continuation of International Application PCT/CN2016/107505 filed on Nov. 28, 2016, which claims priority to Chinese Patent Application No. 201610150188.7 filed on Mar. 16, 2016. The disclosures of the aforementioned applications are hereby incorporated by reference in their entireties.

TECHNICAL FIELD

Embodiments of this application relate to the communications field, and more specifically, to a tunnel binding based communication method and a network device.

BACKGROUND

A hybrid access technology is an emerging technology for binding a fixed access network of a terminal user (for example, a digital subscriber line (DSL) network) to a mobile access network (for example, a Long Term Evolution (LTE) network), to increase user bandwidth. For example, a DSL tunnel and an LTE tunnel between a home gateway (HGW) and a hybrid access aggregation point (HAAP) are bound as a bandwidth connection using a tunnel binding mechanism, so that uplink traffic and downlink traffic of a user are transmitted using the DSL tunnel and the LTE tunnel, and share bandwidth of the DSL tunnel and the LTE tunnel.

In an existing technology, when a tunnel in a binding tunnel is faulty or transmission quality of the tunnel in the binding tunnel degrades, a tunnel switching mechanism is enabled to switch a tunnel binding based transmission mode to a single-tunnel transmission mode. For example, when the LTE tunnel in a binding tunnel constituted by the DSL tunnel and the LTE tunnel is faulty or transmission quality of the LTE tunnel degrades, a service on the LTE tunnel is interrupted, and a service is transmitted using only the DSL tunnel. As a result, a high-bandwidth service in the hybrid access technology cannot continue to be provided.

SUMMARY

Embodiments of this application provide a tunnel binding based communication method and a network device, so that a technical problem can be effectively resolved that a service is interrupted and bandwidth is reduced because a tunnel is faulty in a tunnel binding scenario.

A first aspect provides a tunnel binding based communication method, including:

transmitting, by a first network device, a service packet to a second network device using a first binding tunnel, where the first binding tunnel includes a first tunnel and a second tunnel; and when the first tunnel is faulty or transmission quality of the first tunnel does not meet a preset condition, transmitting, by the first network device, a service packet to the second network device using a second binding tunnel, where the second binding tunnel includes a backup tunnel of the first tunnel and the second tunnel.

In this application, if a tunnel in an original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

In the foregoing implementation, the first tunnel, the second tunnel, and the backup tunnel of the first tunnel are corresponding to a same session identifier (Session ID). Correspondingly, the first binding tunnel constituted by the first tunnel and the second tunnel and the second binding tunnel constituted by the backup tunnel of the first tunnel and the second tunnel are corresponding to a same session ID. In other words, it can also be considered that the first binding tunnel is the same binding tunnel as the second binding tunnel.

With reference to the first aspect, in a first possible implementation of the first aspect, before the transmitting, by the first network device, a service packet to the second network device using a second binding tunnel, the communication method further includes:

receiving, by the first network device, a control packet sent by the second network device, where the control packet is used to indicate a destination IP address of the backup tunnel, and the destination IP address of the backup tunnel is an IP address of a tunnel port of a third network device; and setting up, by the first network device, the backup tunnel with the third network device based on the control packet.

In this application, a backup tunnel of an original binding tunnel is set up. Therefore, when a tunnel in the original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

In the foregoing implementation, the first tunnel, the second tunnel, and the backup tunnel of the first tunnel may all be a Generic Routing Encapsulation (GRE) tunnel. Correspondingly, the first tunnel, the second tunnel, and the backup tunnel are set up using a dynamic GRE tunnel protocol.

With reference to the first possible implementation of the first aspect, in a second possible implementation of the first aspect, the receiving, by the first network device, a control packet sent by the second network device includes:

sending, by the first network device, a request packet to the second network device, where the request packet is used to set up the first tunnel, the request packet includes a source IP address of the first tunnel, and the source IP address of the first tunnel is an IP address of a tunnel port of the first network device; and receiving, by the first network device, a response packet sent by the second network device based on the request packet, where the response packet includes a destination IP address of the first tunnel and the destination IP address of the backup tunnel, the destination IP address of the first tunnel is an IP address of a tunnel port of the second network device, the destination IP address of the backup tunnel is different from the destination IP address of the first tunnel, and the session identifier is used to bind the first tunnel, the second tunnel, and the backup tunnel.

In this application, a packet for exchanging tunnel information (for example, a tunnel source IP address and a tunnel destination IP address) of the first tunnel carries tunnel information (in other words, the destination IP address of the backup tunnel) of the backup tunnel of the first tunnel, so that the tunnel information of the backup tunnel can be obtained based on an existing tunnel setup procedure, to set up the backup tunnel.

With reference to the second possible implementation of the first aspect, in a third possible implementation of the first aspect, the request packet is a Generic Routing Encapsulation tunnel setup request GRE setup request packet, the response packet is a Generic Routing Encapsulation tunnel setup accept GRE setup accept packet, the response packet includes an attribute-value pair AVP attribute field, and the AVP attribute field is used to indicate the destination IP address of the backup tunnel.

In this application, the tunnel information of the first tunnel and the backup tunnel of the first tunnel is obtained using the GRE setup request packet and the GRE setup accept packet. The GRE setup accept packet includes an AVP attribute field used to indicate the destination IP address of the backup tunnel. In comparison with a conventional GRE setup accept packet, only one attribute field is added to the GRE setup accept packet, and compatibility is better.

With reference to the first possible implementation of the first aspect, in a fourth possible implementation of the first aspect, the receiving, by the first network device, a control packet sent by the second network device includes:

sending, by the first network device, a GRE setup request packet used to set up the backup tunnel of the first tunnel to the second network device, where the GRE setup request packet includes a source IP address of the backup tunnel, and the source IP address of the backup tunnel is an IP address of a tunnel port of the first network device; and receiving, by the first network device, a GRE setup accept packet sent by the second network device, where the GRE setup accept packet includes the destination IP address of the backup tunnel.

With reference to any one of the first to the fourth possible implementations of the first aspect, in a fifth possible implementation of the first aspect, the third network device is the second network device.

In this application, the backup tunnel of the first tunnel is set up between the first network device and the second network device.

With reference to any one of the first to the fourth possible implementations of the first aspect, in a sixth possible implementation of the first aspect, the third network device is a network device other than the second network device, and there is a third tunnel between the third network device and the second network device; and the transmitting, by the first network device, a service packet to the second network device using a second binding tunnel includes:

transmitting, by the first network device, a service packet to the second network device using the second binding tunnel and the third tunnel.

In this application, the backup tunnel of the first tunnel is set up between the first network device and the third network device other than the second network device, and the backup tunnel, the first tunnel, and the second tunnel are corresponding to a same session identifier (Session ID). In other words, the backup tunnel is bound to the first tunnel and the second tunnel, so that tunnel binding across devices (between the second network device and the third network device) is implemented. Therefore, in this application, a prior-art technical problem is resolved that a tunnel binding service cannot be provided when a binding tunnel is faulty, and in addition, load balance between tunnels across devices is implemented.

With reference to any one of the first to the sixth possible implementations of the first aspect, in a seventh possible implementation of the first aspect, before the transmitting, by the first network device, a service packet to the second network device using a second binding tunnel, the communication method includes:

sending, by the first network device, a first notify packet to the second network device, where the first notify packet is used to instruct to switch the first tunnel to the backup tunnel.

With reference to any one of the first to the seventh possible implementations of the first aspect, in an eighth possible implementation of the first aspect, the communication method further includes:

when a fault of the first tunnel is rectified or the transmission quality of the first tunnel meets the preset condition, sending, by the first network device, a second notify packet to the second network device, where the second notify packet is used to instruct to switch the backup tunnel to the first tunnel; and transmitting, by the first network device, a service packet to the second network device using the first binding tunnel again.

In this application, a binding tunnel used to transmit a service packet can be flexibly determined based on whether the first tunnel is faulty and communication quality of the first tunnel.

With reference to any one of the first aspect, or the first to the eighth possible implementations of the first aspect, in a ninth possible implementation of the first aspect, the transmitting, by the first network device, a service packet to the second network device using a second binding tunnel includes:

determining, by the first network device, a first service packet sent using the second tunnel, and a second service packet sent using the backup tunnel;

sending, by the first network device, the first service packet to the second network device using the second tunnel, where a destination IP address of the first service packet is a destination IP address of the second tunnel; and sending, by the first network device, the second service packet to the second network device using the backup tunnel, where a destination IP address of the service packet is the destination IP address of the backup tunnel.

With reference to any one of the first aspect, or the first to the eighth possible implementations of the first aspect, in a tenth possible implementation of the first aspect, the transmitting, by the first network device, a service packet to the second network device using a second binding tunnel includes:

receiving, by the first network device using the second tunnel, a third service packet sent by the second network device, and receiving, using the backup tunnel, a fourth service packet sent by the second network device; and performing, by the first network device, reordering processing on the third service packet and the fourth service packet.

A second aspect provides a tunnel binding based communication method, including:

transmitting, by a second network device, a service packet to a first network device using a first binding tunnel, where the first binding tunnel includes a first tunnel and a second tunnel;

when the first tunnel is faulty or transmission quality of the first tunnel does not meet a preset condition, receiving, by the second network device, a first notify packet sent by the first network device, where the first notify packet is used to instruct to switch the first tunnel to a backup tunnel of the first tunnel; and transmitting, by the second network device, a service packet to the first network device based on the first notify packet using a second binding tunnel, where the second binding tunnel includes the backup tunnel and the second tunnel.

In this application, when a tunnel in an original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

With reference to the second aspect, in a first possible implementation of the second aspect, before the transmitting, by the second network device, a service packet to the first network device using a second binding tunnel, the communication method further includes:

sending, by the second network device, a control packet to the first network device, where the control packet is used to indicate a destination IP address of the backup tunnel, and the destination IP address of the backup tunnel is an IP address of a tunnel port of a third network device, so that the first network device sets up the backup tunnel with the third network device.

With reference to the first possible implementation of the second aspect, in a second possible implementation of the second aspect, the sending, by the second network device, a control packet to the first network device includes:

receiving, by the second network device, a request packet sent by the first network device, where the request packet is used to set up the first tunnel, the request packet includes a source IP address of the first tunnel, and the source IP address of the first tunnel is an IP address of a tunnel port of the first network device; and sending, by the second network device, a response packet to the first network device based on the request packet, where the response packet includes a destination IP address of the first tunnel and the destination IP address of the backup tunnel, the destination IP address of the first tunnel is an IP address of a tunnel port of the second network device, and the destination IP address of the backup tunnel is different from the destination IP address of the first tunnel.

With reference to the second possible implementation of the second aspect, in a third possible implementation of the second aspect, the request packet is a GRE setup request packet, the response packet is a GRE setup accept packet, the GRE setup accept packet includes an attribute-value pair AVP attribute field, and the AVP attribute field is used to indicate the destination IP address of the backup tunnel.

With reference to the first possible implementation of the second aspect, in a fourth possible implementation of the second aspect, the sending, by the second network device, a control packet to the second network device includes:

receiving, by the second network device, a GRE setup request packet that is sent by the first network device and that is used to set up the backup tunnel of the first tunnel, where the GRE setup request packet includes a source IP address of the backup tunnel, and the source IP address of the backup tunnel is an IP address of a tunnel port of the first network device; and sending, by the second network device, a GRE setup accept packet to the first network device based on the GRE setup request packet, where the GRE setup accept packet includes the destination IP address of the backup tunnel.

With reference to any one of the first to the fourth possible implementations of the second aspect, in a fifth possible implementation of the second aspect, the third network device is the second network device.

With reference to any one of the first to the fourth possible implementations of the second aspect, in a sixth possible implementation of the second aspect, the third network device is a network device other than the second network device, and there is a third tunnel between the third network device and the second network device; and the transmitting, by the second network device, a service packet to the first network device using a second binding tunnel includes:

transmitting, by the second network device, a service packet to the first network device using the second binding tunnel and the third tunnel.

With reference to the sixth possible implementation of the second aspect, in a seventh possible implementation of the second aspect, the transmitting, by the second network device, a service packet to the first network device using the second binding tunnel and the third tunnel includes:

receiving, by the second network device using the second tunnel, a first service packet sent by the first network device;

receiving, by the second network device using the third tunnel, a second service packet sent by the third network device, where the second service packet is a service packet that is sent by the first network device and that is received by the third network device using the backup tunnel; and performing, by the second network device, reordering processing on the first service packet and the second service packet.

With reference to any one of the first to the seventh possible implementations of the second aspect, in an eighth possible implementation of the second aspect, the communication method further includes:

when the transmission quality of the first tunnel meets the preset condition, receiving, by the second network device, a second notify packet sent by the first network device, where the second notify packet is used to instruct to switch the backup tunnel to the first tunnel; and transmitting, by the second network device, a service packet to the first network device based on the second notify packet using the first binding tunnel again.

A third aspect provides a network device, and the network device is configured to perform the method in any one of the first aspect or the possible implementations of the first aspect.

Specifically, the network device may include a module for performing the method in any one of the first aspect or the possible implementations of the first aspect.

A fourth aspect provides a network device, and the network device is configured to perform the method in any one of the second aspect or the possible implementations of the second aspect.

Specifically, the network device may include a module for performing the method in any one of the second aspect or the possible implementations of the second aspect.

A fifth aspect provides a network device. The network device includes a memory and a processor. The memory is configured to store an instruction, and the processor is configured to execute the instruction stored in the memory. The execution of the instruction stored in the memory enables the processor to perform the method in any one of the first aspect or the possible implementations of the first aspect.

A sixth aspect provides a network device. The network device includes a memory and a processor. The memory is configured to store an instruction, and the processor is configured to execute the instruction stored in the memory. The execution of the instruction stored in the memory enables the processor to perform the method in any one of the second aspect or the possible implementations of the second aspect.

In some of the foregoing implementations, the first notify packet is a GRE notify packet, the GRE notify packet includes an attribute-value pair AVP attribute field, and the AVP attribute field is used to instruct to switch the first tunnel to the backup tunnel of the first tunnel.

In this application, the first network device instructs, using the GRE notify packet, the second network device to switch the first tunnel to the backup tunnel, so as to transmit a service packet using the second binding tunnel constituted by the backup tunnel and the second tunnel. In comparison with a conventional GRE notify packet, only an attribute field used to instruct to switch a faulty tunnel to a backup tunnel of the faulty tunnel is added to the GRE notify packet, and this is well compatible with the prior art.

In some of the foregoing implementations, the second notify packet is a GRE notify packet, the GRE notify packet includes an attribute-value pair AVP attribute field, and the AVP attribute field is used to instruct to switch the backup tunnel to the first tunnel.

In this application, in comparison with a conventional GRE notify packet, only an attribute field used to instruct to switch a faulty tunnel to a backup tunnel of the faulty tunnel is added to the GRE notify packet that is used to instruct to switch the backup tunnel to the first tunnel, and this is well compatible with the prior art.

In the foregoing implementations, that the first tunnel is faulty means that a service on the first tunnel is interrupted. For example, a node that a physical link corresponding to the first tunnel passes through is faulty. That the transmission quality of the first tunnel does not meet the preset condition includes but is not limited to the following situations: (1) A difference between a transmission delay of the first tunnel and a transmission delay of the second tunnel is greater than a first threshold, and correspondingly, the preset condition is that the difference between the transmission delay of the first tunnel and the transmission delay of the second tunnel (assuming that the transmission delay of the first tunnel is greater than or equal to the transmission delay of the second tunnel) is less than or equal to the first threshold; (2) A packet loss rate of the first tunnel exceeds a second threshold, and correspondingly, the preset condition is that the packet loss rate of the first tunnel does not exceed the second threshold.

In the foregoing implementations, the source IP address of the first tunnel is different from a source IP address of the second tunnel. The source IP address of the backup tunnel of the first tunnel may be the same as or different from the source IP address of the first tunnel. The destination IP address of the first tunnel may be the same as or different from the destination IP address of the second tunnel. The destination IP address of the backup tunnel of the first tunnel is different from the destination IP address of the first tunnel.

In the foregoing implementations, the second tunnel may also have a backup tunnel, and the backup tunnel of the first tunnel and the backup tunnel of the second tunnel may be a same tunnel or different tunnels.

In the foregoing implementations of this application, a related tunnel is a Generic Routing Encapsulation (GRE) tunnel.

In the foregoing implementations, a tunnel type of the first tunnel, the second tunnel, and the backup tunnel may be any one of the following types: a tunnel type based on a mobile access network and a tunnel type based on a fixed access network. The mobile access network includes but is not limited to an LTE network, and the fixed access network includes but is not limited to a DSL network.

In the foregoing implementations, the first network device is a home gateway, and the second network device is a hybrid access aggregation point.

Based on the foregoing implementations, compared with the prior art, this application can improve tunnel binding based communication reliability and user satisfaction.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

It should be understood that an access network of a tunnel in the embodiments of this application may be a mobile access network or a fixed access network. The mobile access network includes but is not limited to an LTE network, and the fixed access network includes but is not limited to a DSL network. Specifically, for example, if an access network of a tunnel is an LTE network, the tunnel may be correspondingly referred to as an LTE tunnel; or if an access network of a tunnel is a DSL network, the tunnel may be correspondingly referred to as a DSL tunnel.

In the embodiments of this application, a first network device and a second network device represent two tunnel port devices between which a binding tunnel is set up. Specifically, for example, the first network device is a home gateway (HGW), and the second network device is a hybrid access aggregation point (HAAP); or the first network device is hybrid customer-premises equipment (HCPE) at a user side, and the second network device is a hybrid access gateway (HAG) at a network side. In the embodiments of this application, a third network device represents a network device of a type the same as that of the second network device.

For ease of understanding and description, an example in which a first tunnel is an LTE tunnel, a second tunnel is a DSL tunnel, the first network device is a home gateway (HGW), and the second network device and the third network device are hybrid access aggregation points (HAAP) is used for description. However, the embodiments of this application are not limited thereto.

Figure 1:
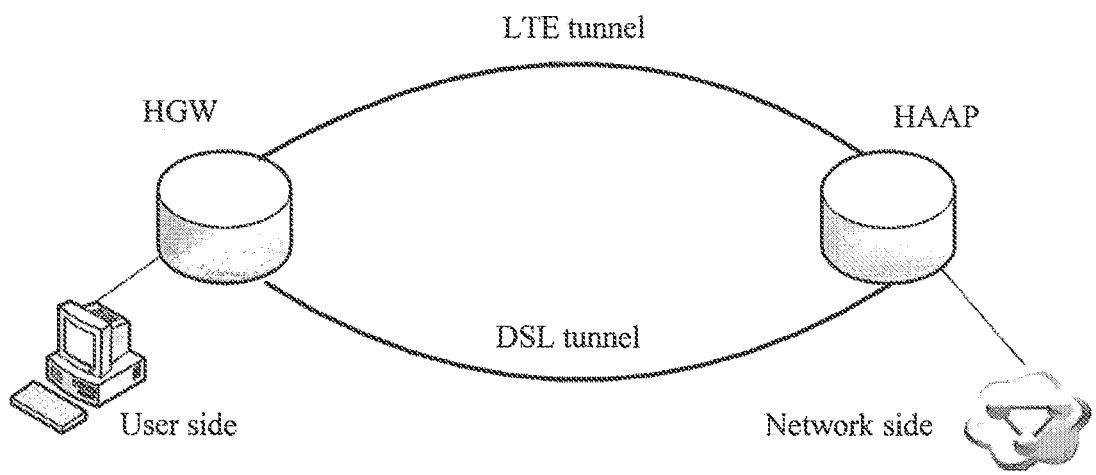
FIG. 1 is a schematic diagram of an application scenario according to an embodiment of this application.

As shown in FIG. 1, in a scenario in which a DSL tunnel and an LTE tunnel constitute a binding tunnel, a round trip time (RTT) of the LTE tunnel changes in real time with LTE network transmission quality or LTE link quality, but an RTT of the DSL tunnel is almost unchanged, and the RTT of the LTE tunnel is usually greater than the RTT of the DSL tunnel. As a result, a transmission rate of the DSL tunnel is different from that of the LTE tunnel. Therefore, based on a hybrid access technology, when a user forwards traffic using both the LTE tunnel and the DSL tunnel, a total traffic transmission rate is reduced because of a larger RRT of the LTE tunnel.

In the prior art, a tunnel switching mechanism is introduced to reduce a traffic transmission delay as much as possible. To be specific, when it is detected that a difference between RTTs of the DSL tunnel and the LTE tunnel reaches a specific switch threshold, the binding tunnel constituted by the DSL tunnel and the LTE tunnel is switched to the DSL tunnel. It may be known that, in the prior art, the tunnel switching mechanism is enabled when LTE network transmission quality of an HGW is very poor or an LTE link of the HGW is faulty. As a result, a service on the LTE tunnel is interrupted, and a high-bandwidth service in the hybrid access technology cannot continue to be provided.

To resolve the foregoing problem, this application provides a tunnel binding based communication method and a network device, to effectively ensure high-bandwidth transmission.

Figure 2:
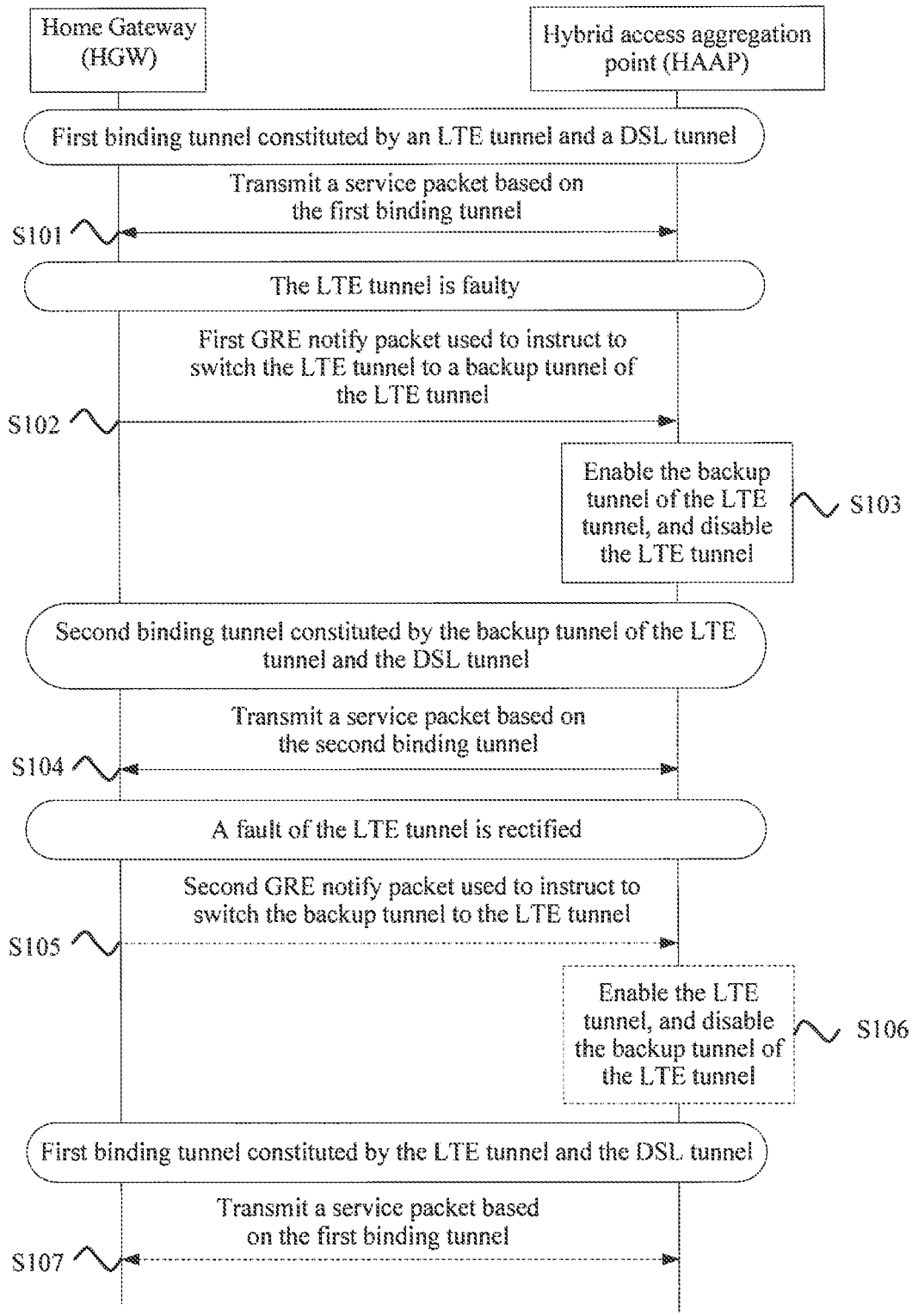
FIG. 2 is a schematic flowchart of a tunnel binding based communication method according to an embodiment of this application.

FIG. 2 is a schematic flowchart of a tunnel binding based communication method according to an embodiment of this application. As shown in FIG. 2, an LTE tunnel and a DSL tunnel are set up between an HGW and an HAAP, and the LTE tunnel and the DSL tunnel constitute a binding tunnel (namely, a first binding tunnel). In S101, a service packet is transmitted between the HGW and the HAAT using the first binding tunnel. In S102, when the LIE tunnel is faulty or transmission quality of the LTE tunnel does not meet a preset threshold, the HOW sends a first GRE notify packet to the HAAP, and the first GRE notify packet is used to instruct to switch the LTE tunnel to a backup tunnel of the LTE tunnel. In S103, the HAAP enables the backup tunnel of the LTE tunnel and disables the LIE tunnel based on the first GRE notify packet. In other words, the LTE tunnel is blocked, and a packet is no longer sent or received using the LTE tunnel, the backup tunnel of the LIE tunnel is enabled, and a packet is transmitted using a binding tunnel (namely, a second binding tunnel) constituted by the DSL tunnel and the backup tunnel, so that the backup tunnel of the LTE tunnel and the DSL tunnel constitute the second binding tunnel between the HGW and the HAAP, In S104, a service packet is transmitted between the HOW and the HAAP using the second binding tunnel.

Specifically, in S101, when the HGW sends a service packet (for example, a user uplink data packet) to the HAAP using the first binding tunnel, a destination IP address of a first service packet to be transmitted on the LTE tunnel is set to a destination IP address of the LTE tunnel, and a destination IP address of a second service packet to be transmitted on the DSL tunnel is set to a destination IP address of the DSL tunnel. It should be understood that, the destination IP address of the LTE tunnel and the destination IP address of the DSL tunnel are an IP address of a tunnel port of the HAAP device, and the destination IP address of the LTE tunnel may be the same as or different from the destination IP address of the DSL tunnel. This is not limited in this embodiment of this application. When the HGW receives, using the first binding tunnel, a service packet (for example, a user downlink data packet) sent by the HAAP, the HGW receives the first service packet using the LTE tunnel, and receives the second service packet using the DSL tunnel. Then, the HIGW performs reordering processing on the first service packet and the second service packet, so that a packet sequence of a service packet obtained after the reordering processing is consistent with a packet sequence of an original service packet obtained by the HAAP from a network side. It should be understood that, in S104, in a process of transmitting a service packet between the HGW and the HAAP using the second binding tunnel, both the HGW and the HAAP need to perform reordering processing on a received service packet.

Specifically, in S102, for example, when detecting that a difference between a transmission delay of the LTE tunnel and a transmission delay of the DSL tunnel is greater than a system threshold, the HGW determines that the LTE tunnel is faulty, and sends the first GRE notify packet to the HAAP.

Therefore, in this embodiment of this application, when a tunnel in an original binding tunnel is faulty, a backup tunnel of the faulty tunnel may be bound to another fault-free tunnel in the original binding tunnel to constitute a new binding tunnel. In this case, high-bandwidth transmission continues to be provided using a tunnel binding mechanism if a tunnel is faulty. Compared with the prior art, this application can improve high-bandwidth transmission reliability and user satisfaction. Optionally, in this embodiment of this application, when a fault of the LTE tunnel is rectified or the transmission quality of the LTE tunnel meets the preset threshold, the HOW transmits a service packet to the HAAP using the first binding tunnel again.

Specifically, as shown in FIG. 2, in S105, when a fault of the LTE tunnel is rectified, the HGW sends a second GRE notify packet to the HAAP, and the second GRE notify packet is used to instruct to switch the backup tunnel of the LTE tunnel to the LTE tunnel. In S106, the HAAP disables the backup tunnel of the LTE tunnel and enables the LTE tunnel based on the second GRE notify packet sent by the HGW. In other words, the backup tunnel of the LTE tunnel is blocked, and a packet is no longer sent or received using the backup tunnel of the LTE tunnel, the LTE tunnel is enabled again, and a packet is transmitted using the DSL tunnel and the LTE tunnel. In S107, a service packet is transmitted between the HGW and the HAAP using the first binding tunnel again.

Therefore, in this embodiment of this application, a binding tunnel can be flexibly adjusted as a tunnel dynamically changes. High-bandwidth transmission can be improved using the tunnel binding mechanism regardless of which tunnel is faulty. In comparison with the prior art, high-bandwidth transmission reliability can be effectively improved.

Optionally, in this embodiment of this application, the HGW and the HAAP may be configured as follows: The LTE tunnel is switched to the backup tunnel of the LTE tunnel when the LTE tunnel is faulty, and the backup tunnel of the LTE tunnel is switched to the LTE tunnel after the LTE tunnel is restored to normal. In other words, in the procedure shown in FIG. 2, optionally, step S102 and step S105 may be omitted.

In this embodiment of this application, the backup tunnel of the LTE tunnel is set up before a service packet is transmitted using the second binding tunnel.

Figure 3:
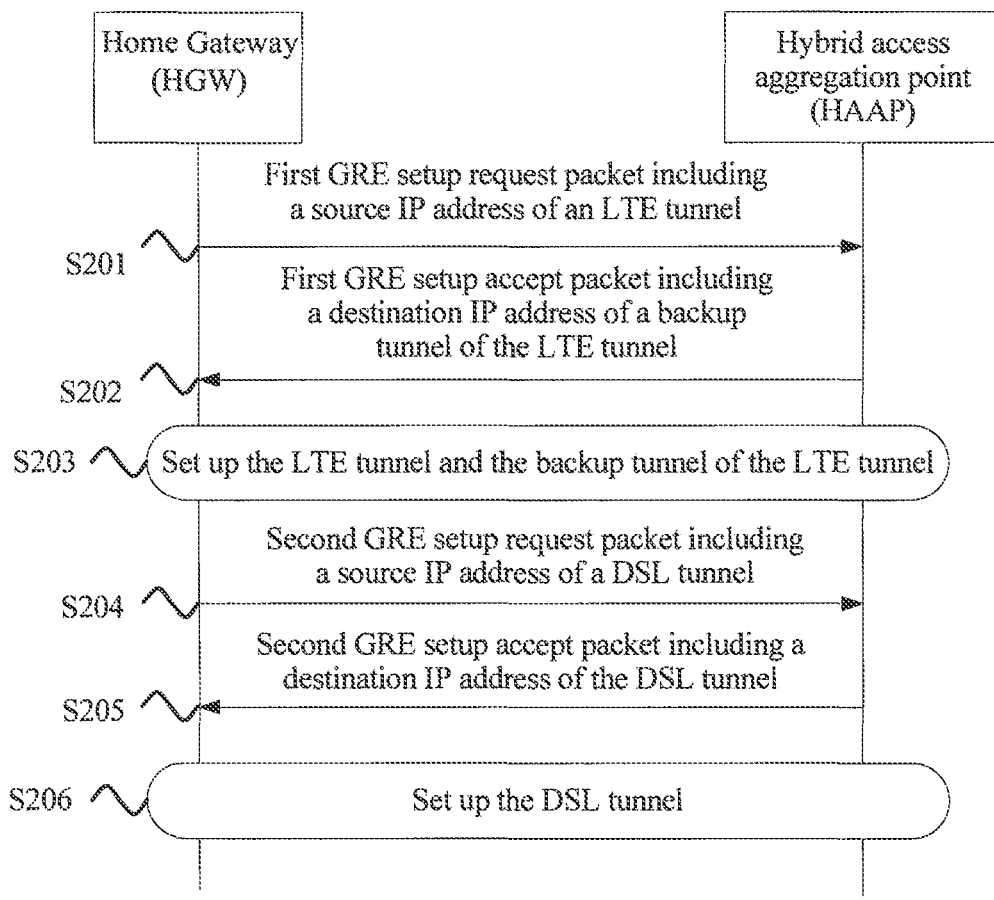
FIG. 3 is another schematic flowchart of a tunnel binding based communication method according to an embodiment of this application.

FIG. 3 is a schematic flowchart of setting up a DSL tunnel, an LTE tunnel, and a backup tunnel of the LTE tunnel according to an embodiment of this application.

As shown in FIG. 3, in S201, an HGW initiates a request for setting up an LTE tunnel. The HGW sends a first GRE setup request packet for requesting setup of the LTE tunnel to an HAAP. The first GRE setup request packet includes a source IP address of the LTE tunnel, and the source IP address of the LTE tunnel is an IP address of a tunnel port of the HG.

Specifically, the HGW sends, based on a device IP address (or may also be referred to as a T2 address) of the HAAP, the first GRE setup request packet used to set up the LTE tunnel to the HAAP.

In S202, the HAAP sends a first GRE setup accept packet in response to the first GRE setup request packet to the HGW. The first GRE setup accept packet includes a destination IP address of the LTE tunnel, a destination IP address of a backup tunnel of the LTE tunnel, and a session identifier (Session ID) allocated to the HGW. The destination IP address of the backup tunnel of the LTE tunnel is different from the destination IP address of the LTE tunnel. The destination IP address of the LTE tunnel is an IP address of a first tunnel port of the HAAP, and the destination IP address of the backup tunnel of the LTE tunnel is an IP address of a second tunnel port of the HAAP or an IP address of a tunnel port of an HAAP (namely, a backup HAAP) other than the HAAP.

Specifically, after receiving the first GRE setup request packet sent by the HGW, the HAAP authenticates the source IP address of the LTE tunnel, for example, authenticates whether the source IP address of the LTE tunnel is valid. After the authentication succeeds, the destination IP address of the LTE tunnel and the destination IP address of the backup tunnel of the LTE tunnel are determined, and the session ID is allocated to the HGW. Then, the first accept packet including the destination IP address of the LTE tunnel, the destination IP address of the backup tunnel of the LTE tunnel, and the session ID allocated to the HGW is sent to the HGW.

It should be understood that the LTE tunnel and the backup tunnel of the LTE tunnel are corresponding to a same session ID.

It should be further understood that the destination IP address of the LTE tunnel and the destination IP address of the backup tunnel of the LTE tunnel may be preconfigured on the HAAP.

In S203, after receiving the first accept packet sent by the HAAP, the HGW sets up the LTE tunnel and the backup tunnel of the LTE tunnel based on a tunnel source IP address and a tunnel destination IP address.

Optionally, in this embodiment of this application, a source IP address of the backup tunnel of the LTE tunnel may be the same as the source IP address of the LTE tunnel. In this case, both the HGW and the HAAP learn of the source IP addresses and the destination IP addresses of the LTE tunnel and the backup tunnel of the LTE tunnel, and may set up the LTE tunnel and the backup tunnel of the LTE tunnel based on the tunnel source IP addresses and the tunnel destination IP addresses.

Optionally, in this embodiment of this application, the source IP address of the backup tunnel of the LTE tunnel may be different from the source IP address of the LTE tunnel. For example, the source IP address of the backup tunnel of the LTE tunnel is an IP address of a tunnel port other than the first tunnel port of the HGW. In this case, the HGW further needs to send a GRE setup request packet used to set up the backup tunnel of the LTE tunnel to the HAAP. The GRE setup request packet includes the source IP address of the backup tunnel of the LTE tunnel and the session ID of the HGW. The HAAP sends a GRE setup accept packet to the HGW. The GRE setup accept packet includes the destination IP address of the backup tunnel of the LTE tunnel. The backup tunnel of the LTE tunnel may be set up based on a tunnel source IP address and a tunnel destination IP address.

In S204, the HGW initiates a request for setting up a DSL tunnel. The HGW sends a second GRE setup request packet for requesting setup of the DSL tunnel to the HAAP. The second GRE setup request packet includes a source IP address of the DSL tunnel and the session ID obtained when the LTE tunnel is set up, and the source IP address of the DSL tunnel is an IP address of a second tunnel port of the HGW.

Specifically, the HGW sends, based on the device IP address of the HAAP, the second request packet used to set up the DSL tunnel to the HAAP.

In S205, the HAAP sends a second GRE setup accept packet in response to the second GRE setup request packet to the HGW. The second GRE setup accept packet includes a destination IP address of the DSL tunnel and the session identifier (Session ID) allocated to the HGW. The destination IP address of the DSL tunnel is an IP address of a third tunnel port of the HAAP.

Specifically, after receiving the second request packet sent by the HGW, the HAAP authenticates the source IP address of the DSL tunnel, for example, authenticates whether the source IP address of the DSL tunnel is valid. After the authentication succeeds, the destination IP address of the DSL tunnel is determined, and then the second GRE setup accept packet including the destination IP address of the DSL tunnel and the session ID allocated to the HGW is sent to the HGW.

In S206, the DSL tunnel is set up based on a tunnel source IP address and a tunnel destination IP address.

It should be understood that the DSL tunnel, the LTE tunnel, and the backup tunnel of the LTE tunnel are corresponding to a same session ID.

Optionally, in this embodiment of this application, in S205, the HAAP may further add a destination IP address of a backup tunnel of the DSL tunnel to the second GRE setup accept packet. The destination IP address of the backup tunnel of the DSL tunnel is different from the destination IP address of the DSL tunnel. The destination IP address of the DSL tunnel is the IP address of the third tunnel port of the HAAP, and the destination IP address of the backup tunnel of the DSL tunnel is an IP address of a fourth tunnel port of the HAAP or an IP address of a tunnel port of an HAAP other than the HAAP. After receiving the second GRE setup accept packet sent by the HAAP, the HGW stores the destination IP address of the DSL tunnel and the destination IP address of the backup tunnel of the DSL tunnel. The DSL tunnel and the backup tunnel of the DSL tunnel are set up based on a tunnel source IP address and a tunnel destination IP address.

Optionally, in this embodiment of this application, a source IP address of the backup tunnel of the DSL tunnel may be the same as the source IP address of the DSL tunnel. In this case, both the HGW and the HAAP learn of the source IP addresses and the destination IP addresses of the DSL tunnel and the backup tunnel of the DSL tunnel, and may set up corresponding tunnels based on the tunnel source IP addresses and the tunnel destination IP addresses.

Optionally, in this embodiment of this application, the source IP address of the backup tunnel of the DSL tunnel may be different from the source IP address of the DSL tunnel. In this case, the HGW needs to send a GRE setup request packet used to set up the backup tunnel of the DSL tunnel to the HAAP. The GRE setup request packet includes the source IP address of the backup tunnel of the DSL tunnel and the session ID of the HGW. The HAAP sends a GRE setup accept packet to the HGW. The GRE setup accept packet includes the destination IP address of the backup tunnel of the DSL tunnel.

In this embodiment of this application, the LTE tunnel and the DSL tunnel are corresponding to a same session ID. To be specific, the LTE tunnel and the DSL tunnel constitute a binding tunnel. In other words, a same HGW is corresponding to a same session ED, and a plurality of tunnels set up by a same HGW constitutes a binding tunnel.

It should be understood that, in this embodiment of this application, the backup tunnel of the LTE tunnel and the backup tunnel of the DSL tunnel are also corresponding to the session ID of the HGW. In other words, the backup tunnel of the LTE tunnel and the DSL tunnel may also constitute a binding tunnel, and the backup tunnel of the DSL tunnel and the LTE tunnel may also constitute a binding tunnel. In conclusion, a same session ID identifies one binding tunnel of an HOW.

In this embodiment of this application, the HGW and the HAAP first communicate with each other using the LTE tunnel and the DSL tunnel by default, to be specific, communicate with each other using the binding tunnel constituted by the LTE tunnel and the DSL tunnel. The backup tunnel of the LTE tunnel and the backup tunnel of the DSL tunnel do not work.

When detecting that the LTE tunnel or the DSL tunnel is faulty, the HGW switches a faulty tunnel to a backup tunnel of the faulty tunnel. For example, when detecting that the LTE tunnel is faulty, the HGW instructs the HAAP to switch the LTE tunnel to the backup tunnel of the LTE tunnel. Then, the HGW and the HAAP communicate with each other using the binding tunnel constituted by the DSL tunnel and the backup tunnel of the LTE tunnel.

It should be understood that a destination IP address of a tunnel (the LTE tunnel, the DSL tunnel, or the backup tunnel) sent by the HAAP to the HGW may be preconfigured on the HAAP.

In this embodiment of this application, specifically, a tunnel may be set up using a dynamic GRE tunnel protocol. For example, the source IP address and the destination IP address of the LTE tunnel and the source IP address and the destination IP address of the DSL tunnel are obtained by exchanging a GRE control packet (namely, a GRE setup request packet and a GRE setup accept packet) between the HGW and the HAAP.

Optionally, in this embodiment of this application, an attribute-value pair (Attribute-Value Pair, AVP) attribute field is set in the GRE control packet. The AVP attribute field is used to carry a destination IP address of a backup tunnel of a primary tunnel (the LTE tunnel or the DSL tunnel), or carry instruction information used to instruct to switch a primary tunnel to a backup tunnel or switch a backup tunnel to a primary tunnel. Specifically, a format of the AVP (Format of the AVP) attribute field in this embodiment of this application is shown as follows:

```
+-+-+-+-+-+-+-+-+
| Attribute Type |                              (1 byte)
+-+-+-+-+-+-+-+-+-+-+-+-+-+-+-+-+
| Attribute Length |                            (2 bytes)
+-+-+-+-+-+-+-+-+-+-+-+-+-+-+-+-+
| Attribute Value ~                             (variable)
+-+-+-+-+-+-+-+-+-+-+-+-+-+-+-+-+
```

An "Attribute Type" (attribute type) includes three types: 36, 37, and 38. An "Attribute Length" (attribute length) and an "Attribute Value" (attribute value) corresponding to each of the three types are separately shown in Table 1:

TABLE 1

| Attribute type | Attribute value | Attribute length | GRE control packet in which an AVP attribute field is carried |
|---|---|---|---|
| 36 | Backup T3 IPv4 address | 4 bytes | GRE setup accept |
| 37 | Backup T3 IPv6 address | 16 bytes | GRE setup accept |
| 38 | Switching to backup tunnel or back to primary tunnel | 2 bytes | GRE notify |

It may be learned from Table 1 that, when an attribute type of an AVP attribute field is 36, an attribute value of the AVP attribute field is "Backup T3 IPv4 address", and the AVP attribute field is carried in a GRE setup accept packet, so that the HAAP instructs the HGW to use "Backup T3 IPv4 address" as the destination IP address of the backup tunnel of the primary tunnel (for example, the LTE tunnel and/or the DSL tunnel). When the attribute type of the AVP attribute field is 37, the attribute value of the AVP attribute field is "Backup T3 IPv6 address", and the AVP attribute field is also carried in a GRE setup accept packet, so that the HAAP instructs the HGW to use "Backup T3 IPv6 address" as the destination IP address of the backup tunnel of the primary tunnel (for example, the LTE tunnel and/or the DSL tunnel). When the attribute type of the AVP attribute field is 38, the attribute value of the AVP attribute field is "Switching to backup tunnel or back to primary tunnel", and the AVP attribute field is carried in a GRE notify packet, so that the HGW instructs the HAAP to switch a primary tunnel (for example, the LTE tunnel and/or the DSL tunnel) to a backup tunnel of the primary tunnel, or switch a backup tunnel to a primary tunnel corresponding to the backup tunnel.

Specifically, as shown in FIG. 3, if the first GRE setup accept packet sent by the HAAP to the HGW includes an AVP attribute field (corresponding to the second line in Table 1) with an attribute type "36", an attribute value "Backup T3 IPv4 address", and an attribute length "4 bytes", the HGW can learn that the destination IP address of the backup tunnel of the LTE tunnel is "T3 IPv4 address" based on the first GRE setup accept packet. For another example, if the first GRE setup accept packet sent by the HAAP to the HGW includes an AVP attribute field (corresponding to the third line in Table 1) with an attribute type "37", an attribute value "Backup T3 IPv6 address", and an attribute length "16 bytes", the HGW can learn that the destination IP address of the backup tunnel of the LTE tunnel is "T3 IPv6 address" based on the first GRE setup accept packet. It should be understood that the second GRE setup accept packet sent by the HAAP to the HGW may also include an AVP attribute field with an attribute type "36" or "37". In this case, the HGW can learn of the destination IP address of the backup tunnel of the DSL tunnel based on the second GRE setup accept packet.

It should be understood that the device IP address of the HAAP may also be referred to as the T2 address, and an IP address of a tunnel port of the HAAP may also be referred to as a T3 address.

Specifically, as shown in FIG. 2, when a first GRE notify packet sent by the HGW to the HAAP includes an AVP attribute field (corresponding to the fourth line in Table 1) with an attribute type "38", an attribute value "Switching to backup tunnel", and an attribute length "2 bytes", the HAAP can learn, based on the first GRE notify packet, that the LTE tunnel needs to be switched to the backup tunnel of the LTE tunnel. For another example, if a second GRE notify packet sent by the HGW to the HAAP includes an AVP attribute field (corresponding to the fourth line in Table 1) with an attribute type "38", an attribute value "Switching back to primary tunnel", and an attribute length "2 bytes", the HAAP can, based on the second GRE notify packet, that a backup tunnel needs to be switched to a primary tunnel (for example, the LTE tunnel) corresponding to the backup tunnel.

It should be further understood that, in a tunnel binding scenario, a receiving end performs reordering processing on a packet received using a binding tunnel. For example, the HGW sends a packet sequence to the HAAP using the DSL, tunnel and the LTE tunnel. However, the packet sequence may not arrive at the HAAP end in accordance with an original order, and this phenomenon is referred to as packet out-of-order. Therefore, the HAAP that serves as a packet receiving end needs to perform reordering processing on a packet received using the DSL tunnel and the LTE tunnel, to be specific, performs reordering processing on the received packet in an order in which a packet sequence of a user enters the binding tunnel (the DSL tunnel and the LTE tunnel), so that a packet sequence obtained after the reordering processing is consistent with a packet sequence obtained by the HMV from the user.

In this embodiment of this application, when the LTE tunnel is faulty or the transmission quality of the LTE tunnel does not meet a preset condition, when the HGW transmits a service packet to the HAAP using a second binding tunnel, the packet receiving end needs to perform reordering processing on the received service packet.

Figure 4:
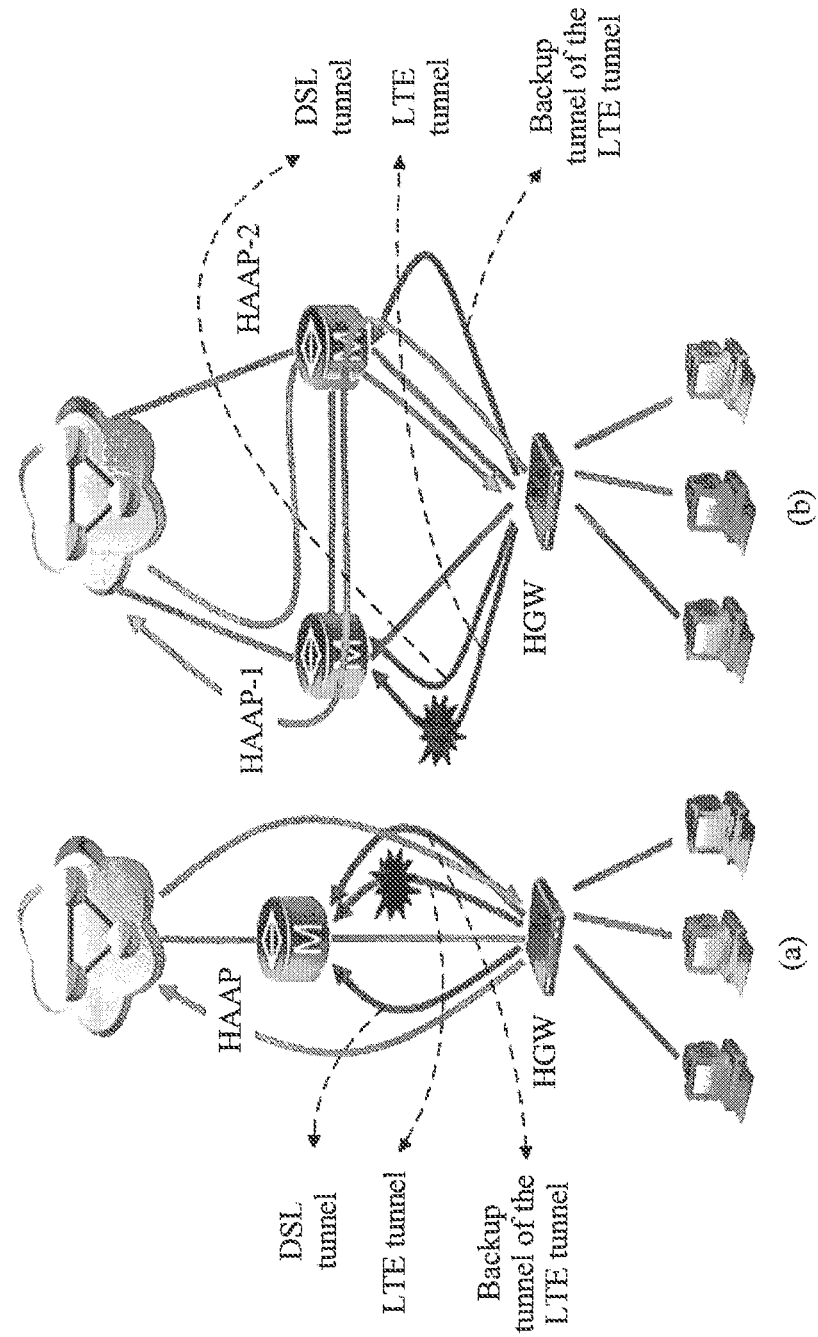
FIG. 4 is a schematic diagram of a tunnel binding based communication method according to an embodiment of this application.

As shown in FIG. 4, in an embodiment of this application, a backup tunnel of an LTE tunnel and the LTE tunnel may be corresponding to a same HAAP device (as shown by reference (a)), and the backup tunnel of the LTE tunnel and the LTE tunnel may also be corresponding to different HAAP devices (as shown by reference (b)).

For two scenarios shown in FIG. 4, the following describes a procedure in which a packet receiving end performs reordering processing on a packet received using a binding tunnel.

Scenario 1 (reference (a)): A DSL tunnel, an LTE tunnel, and a backup tunnel of the LTE tunnel are set up between an HGW (corresponding to a first network device) and an HAAP (corresponding to a second network device and a third network device).

(1). After the HAAP receives a GRE notify packet that is sent by the HGW and that is used to instruct to switch the LTE tunnel to the backup tunnel of the LTE tunnel, the HAAP disables the LTE tunnel, and enables the backup tunnel of the LTE tunnel.

Optionally, in this embodiment of this application, a backup tunnel enabling identifier is set for the backup tunnel. For example, when the backup tunnel is disabled, the tunnel enabling identifier is set to "0"; or when the backup tunnel is enabled, the enabling identifier is set to "1".

(2). When the HAAP receives a user uplink packet sent by the HGW, and learns, based on a tunnel identifier of the backup tunnel, that the HAAP needs to receive the user uplink packet using the backup tunnel, the HAAP receives, using the backup tunnel of the LTE tunnel, the user uplink packet sent by the HGW. A GRE packet header of the user uplink packet carries a source IP address of the backup tunnel.

(3). The HAAP parses the GRE packet header of the user uplink packet to obtain the source IP address of the backup tunnel.

(4). The HAAP determines, based on the source IP address of the backup tunnel, a session ID corresponding to the backup tunnel.

It should be understood that source IP addresses and/or destination IP addresses of the DSL tunnel, the LTE tunnel, and the backup tunnel are corresponding to a same session ID.

(5). The HAAP determines a tunnel (namely, the DSL tunnel) that is other than the LTE tunnel and the backup tunnel and that is corresponding to the session ID.

(6). The HAAP stores, in a same cache, a user uplink packet received using the DSL tunnel and the user uplink packet received using the backup tunnel, to perform uniform reordering processing, and then forwards user uplink packets obtained after the reordering processing, for example, forwards the user uplink packets to a network server.

It should be understood that, when receiving a user downlink packet delivered by a network side, the HAAP first determines a first downlink packet transmitted using the DSL tunnel and a second downlink packet transmitted using the backup tunnel, and then sends the first downlink packet using the DSL tunnel, and sends the second downlink packet using the backup tunnel.

Optionally, in this embodiment of this application, the HAAP includes a tunnel management module, configured to disable the LTE tunnel and enable the backup tunnel of the LTE tunnel based on the GRE notify packet that is used to instruct to switch the LTE tunnel to the backup tunnel of the LTE tunnel.

Scenario 2 (reference (b)): A DSL tunnel and an LTE tunnel are set up between an HGW (corresponding to a first network device) and an HAAP-1 (corresponding to a second network device), and a backup tunnel of the LTE tunnel is set up between the HGW and an HAAP-2 (corresponding to a third network device).

There is a static GRE tunnel (corresponding to a third tunnel) between the HAAP-1 and the HAAP-2, and the static GRE tunnel is used to transmit tunnel information and forward user traffic between the HAAP-1 and the HAAP-2.

To set up or delete the DSL tunnel and the LTE tunnel that are bound on the HAAP-1, related tunnel information is sent to the HAAP-2 using the static GRE tunnel. The HAAP-2 generates or deletes a tunnel entry based on the related tunnel information. The tunnel entry includes a backup tunnel enabling identifier.

(1). The HAAP-1 receives a GRE notify packet that is sent by the HGW and that is used to instruct to switch the LTE tunnel to the backup tunnel of the LTE tunnel.

Specifically, the GRE notify packet carries an AVP attribute field (Switch to backup tunnel).

(2). The HAAP-1 sets a backup tunnel identifier in a tunnel entry (for example, set the backup tunnel identifier to "1") based on the GRE notify packet, and enables the backup tunnel.

(3). The HAAP-2 receives, using the backup tunnel, a first user uplink packet sent by the HGW, and forwards the first user uplink packet to the HAAP-1 using the static GRE tunnel.

Specifically, the HAAP-2 transparently transmits the first user uplink packet to the HAAP-1 using the static GRE tunnel, and the HAAP-2 performs no reordering processing on the first user uplink packet.

(4). After receiving the first user uplink packet forwarded using the static GRE tunnel, the HAAP-1 first removes an outer GRE header (a GRE header encapsulated by the static GRE tunnel) of the first user uplink packet, then parses a GRE header (to be specific, a GRE header encapsulated by the backup tunnel) of the first user uplink packet to obtain a source IP address of the backup tunnel, and determines a session ID corresponding to the source IP address of the backup tunnel.

(5). The HAAP-1 determines a tunnel (namely, the DSL tunnel) that is other than the LTE tunnel and the backup tunnel and that is corresponding to the session ID.

(6). The HAAP stores, in a same cache, a user uplink packet received using the DSL tunnel and the user uplink packet received using the backup tunnel, to perform uniform reordering processing, and then forwards user uplink packets obtained after the reordering processing, for example, forwards the user uplink packets to a network server.

It should be understood that, when receiving a user downlink packet delivered by a network side, the HAAP-1 first determines a first downlink packet transmitted using the DSL tunnel and a second downlink packet transmitted using the backup tunnel, and then sends the first downlink packet using the DSL tunnel, and sends the second downlink packet using the backup tunnel.

Optionally, in this embodiment of this application, the HAAP includes a tunnel management module, configured to disable the LTE tunnel and enable the backup tunnel of the LTE tunnel based on the GRE notify packet that is used to instruct to switch the LTE tunnel to the backup tunnel of the LTE tunnel.

After receiving the user downlink packet delivered by the network side, the HAAP-1 first determines the first downlink packet transmitted using the DSL tunnel and the second downlink packet transmitted using the backup tunnel, and successively marks serial numbers on packet sequences that enter the DSL tunnel and the backup tunnel bound together. Then, the HAAP-1 transparently transmits, to the HAAP-2 using the static GRE tunnel, the second downlink packet that needs to enter the backup tunnel. The HAAP-2 performs no reordering processing on the second downlink packet received from the static GRE tunnel, but forwards the second downlink packet to the HGW using the backup tunnel after removing an outer GRE header (a GRE header encapsulated by the static GRE tunnel) of the second downlink packet.

It should be understood that the HAAP shown in (a) is corresponding to the second network device and the third network device. In other words, in this scenario, the second network device and the third network device are a same device. The HAAP-1 shown in (b) is corresponding to the second network device, and the HAAP-2 is corresponding to the third network device.

It should be understood that the tunnel binding based communication method enumerated with reference to FIG. 2 to FIG. 4 is merely an example for description. This application is not limited thereto. For example, when the DSL tunnel is faulty, the DSL tunnel is switched to the backup tunnel of the DSL tunnel, and a service packet is transmitted using the binding tunnel constituted by the backup tunnel of the DSL tunnel and the LTE tunnel.

It should be understood that the example shown in FIG. 4 is intended to better help a person skilled in the art better understand this embodiment of this application, but is not intended to limit this application to these specific forms. Apparently, a person skilled in the art can perform various equivalent modifications or changes based on the example provided in FIG. 4, and such modifications or changes also fall within the scope of the embodiments of this application.

Therefore, in this embodiment of this application, if a tunnel in an original binding tunnel is faulty, a tunnel binding based high-bandwidth service continues to be provided using another binding tunnel constituted by a backup tunnel of the faulty tunnel and a fault-free tunnel. Therefore, in the embodiments of this application, a prior-art technical problem is resolved that a service is interrupted and bandwidth is reduced because a tunnel link is faulty in a tunnel binding scenario, and high-bandwidth communication reliability can be improved, so as to improve user satisfaction.

In the embodiments of this application, the first tunnel and the second tunnel that constitute the first binding tunnel are corresponding to a first session identifier, and the backup tunnel of the first tunnel and the second tunnel that constitute the second binding tunnel are corresponding to a second session identifier. The first session identifier may be the same as or different from the second session identifier.

Figure 5:
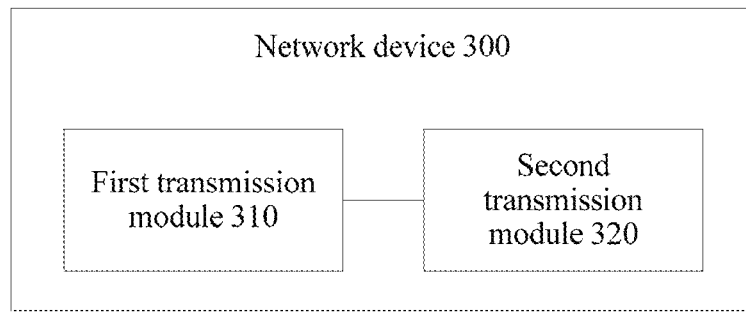
FIG. 5 is a schematic block diagram of a network device according to an embodiment of this application.

FIG. 5 is a schematic block diagram of a network device 300 according to an embodiment of this application. The network device 300 includes:

a first transmission module 310, configured to transmit a service packet to a second network device using a first binding tunnel, where the first binding tunnel includes a first tunnel and a second tunnel; and a second transmission module 320, configured to: when the first tunnel is faulty or transmission quality of the first tunnel does not meet a preset condition, transmit a service packet to the second network device using a second binding tunnel, where the second binding tunnel includes a backup tunnel of the first tunnel and the second tunnel.

In this embodiment of this application, a backup tunnel of an original binding tunnel is set up. Therefore, when a tunnel in the original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

Optionally, in this embodiment of this application, the network device 300 further includes:

a receiving module 330, configured to: before a service packet is transmitted to the second network device using the second binding tunnel, receive a control packet sent by the second network device, where the control packet is used to indicate a destination IP address of the backup tunnel, and the destination IP address of the backup tunnel is an IP address of a tunnel port of a third network device; and a tunnel setup module 340, configured to set up the backup tunnel with the third network device based on the control packet received by the receiving module.

Optionally, in this embodiment of this application, the receiving module 330 includes:

a sending unit, configured to send a request packet to the second network device, where the request packet is used to set up the first tunnel, the request packet includes a source IP address of the first tunnel, and the source IP address of the first tunnel is an IP address of a tunnel port of the network device; and a receiving unit, configured to receive a response packet sent by the second network device based on the request packet sent by the sending unit, where the response packet includes a destination IP address of the first tunnel and the destination IP address of the backup tunnel, the destination IP address of the first tunnel is an IP address of a tunnel port of the second network device, and the destination IP address of the backup tunnel is different from the destination IP address of the first tunnel.

Optionally, in this embodiment of this application, the request packet is a Generic Routing Encapsulation tunnel setup request packet, the response packet is a Generic Routing Encapsulation tunnel setup accept packet, the response packet includes an attribute-value pair (AVP) attribute field, and the AVP attribute field is used to indicate the destination IP address of the backup tunnel.

Optionally, in this embodiment of this application, the third network device is the second network device.

Optionally, in this embodiment of this application, the third network device is a network device other than the second network device, and there is a third tunnel between the third network device and the second network device.

The second transmission module 320 is configured to transmit a service packet to the second network device using the second binding tunnel and the third tunnel.

Optionally, in this embodiment of this application, the network device 300 includes:

a first sending module 350, configured to: before a service packet is transmitted to the second network device using the second binding tunnel, send a first notify packet to the second network device, where the first notify packet is used to instruct to switch the first tunnel to the backup tunnel.

Optionally, in this embodiment of this application, the first notify packet is a Generic Routing Encapsulation tunnel notify packet, the GRE notify packet includes an attribute-value pair AVP attribute field, and the AVP attribute field is used to instruct to switch the first tunnel to the backup tunnel of the first tunnel.

Optionally, in this embodiment of this application, the network device 300 further includes:

a second sending module 360, configured to: when the transmission quality of the first tunnel meets the preset condition, send a second notify packet to the second network device, where the second notify packet is used to instruct to switch the backup tunnel to the first tunnel.

The first transmission module 310 is configured to transmit a service packet to the second network device using the first binding tunnel again.

Optionally, in this embodiment of this application, the second notify packet is a GRE notify packet, the GRE notify packet includes an attribute-value pair AVP attribute field, and the AVP attribute field is used to instruct to switch the backup tunnel to the first tunnel.

Optionally, in this embodiment of this application, the network device 300 is a home gateway, and the second network device is a hybrid access aggregation point.

It should be understood that, the network device 300 in this embodiment of this application may be corresponding to the network device in the tunnel binding based communication method in the embodiments of this application, and the foregoing and other operations and/or functions of the modules of the network device 300 are separately used to implement corresponding procedures of the methods in FIG. 2 to FIG. 4. For brevity, details are not described herein again.

Figure 6:
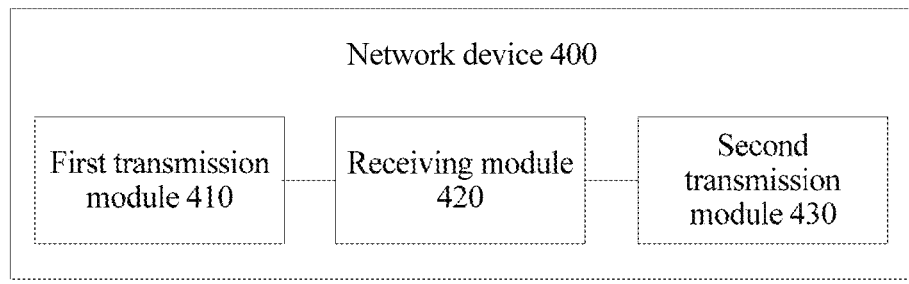
FIG. 6 is another schematic block diagram of a network device according to an embodiment of this application.

FIG. 6 is a schematic block diagram of a network device 400 according to an embodiment of this application. The network device 400 includes: a first transmission module 410, configured to transmit a service packet to a first network device using a first binding tunnel, where the first binding tunnel includes a first tunnel and a second tunnel; a receiving module 420, configured to: when the first tunnel is faulty or transmission quality of the first tunnel does not meet a preset condition, receive a first notify packet sent by the first network device, where the first notify packet is used to instruct to switch the first tunnel to a backup tunnel of the first tunnel; and a second transmission module 430, configured to transmit a service packet to the first network device based on the first notify packet using a second binding tunnel, where the second binding tunnel includes the backup tunnel and the second tunnel.

In this embodiment of this application, a backup tunnel of an original binding tunnel is set up. Therefore, when a tunnel in the original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

Optionally, in this embodiment of this application, the network device 400 further includes:

a sending module 440, configured to: before a service packet is transmitted by the terminal access device to the first network device using the second binding tunnel, send a control packet to the first network device, where the control packet is used to indicate a destination IP address of the backup tunnel, and the destination IP address of the backup tunnel is an IP address of a tunnel port of a third network device, so that the first network device sets up the backup tunnel with the third network device.

Optionally, in this embodiment of this application, the sending module 440 includes:

a first receiving unit, configured to receive a request packet sent by the first network device, where the request packet is used to set up the first tunnel, the request packet includes a source IP address of the first tunnel, and the source IP address of the first tunnel is an IP address of a tunnel port of the first network device; and a first sending unit, configured to send a response packet to the first network device based on the request packet, where the response packet includes a destination IP address of the first tunnel and the destination IP address of the backup tunnel, the destination IP address of the first tunnel is an IP address of a tunnel port of the network device, and the destination IP address of the backup tunnel is different from the destination IP address of the first tunnel.

Optionally, in this embodiment of this application, the request packet is a GRE setup request packet, the response packet is a GRE setup accept packet, the GRE setup accept packet includes an attribute-value pair AVP attribute field, and the AVP attribute field is used to indicate the destination IP address of the backup tunnel.

Optionally, in this embodiment of this application, the third network device is the network device.

Optionally, in this embodiment of this application, the third network device is a network device other than the network device, and there is a third tunnel between the third network device and the network device.

The second transmission module 430 is configured to transmit a service packet to the first network device using the second binding tunnel and the third tunnel.

Optionally, in this embodiment of this application, the second transmission module 430 includes:

a second receiving unit, configured to receive, using the second tunnel, a first service packet sent by the first network device;

a third receiving unit, configured to receive, using the third tunnel, a second service packet sent by the third network device, where the second service packet is a service packet that is sent by the first network device and that is received by the third network device using the backup tunnel; and a reordering unit, configured to perform reordering processing on the first service packet and the second service packet.

Optionally, in this embodiment of this application, the first notify packet is a GRE notify packet, the GRE notify packet includes an attribute-value pair AVP attribute field, and the AVP attribute field is used to instruct to switch the first tunnel to the backup tunnel of the first tunnel.

Optionally, in this embodiment of this application, the receiving module 420 is further configured to: when the transmission quality of the first tunnel meets the preset condition, receive a second notify packet sent by the first network device, where the second notify packet is used to instruct to switch the backup tunnel to the first tunnel.

The first transmission module 410 is configured to transmit a service packet to the first network device based on the second notify packet using the first binding tunnel again.

Optionally, in this embodiment of this application, the second notify packet is a GRE notify packet, the GRE notify packet includes an attribute-value pair AVP attribute field, and the AVP attribute field is used to instruct to switch the backup tunnel to the first tunnel.

Optionally, in this embodiment of this application, the network device 400 is a hybrid access aggregation point, and the first network device is a home gateway.

It should be understood that, the network device 400 in this embodiment of this application may be corresponding to the network device in the tunnel binding based communication method in the embodiments of this application, and the foregoing and other operations and/or functions of the modules of the network device 400 are separately used to implement corresponding procedures of the methods in FIG. 2 to FIG. 4. For brevity, details are not described herein again.

Figure 7:
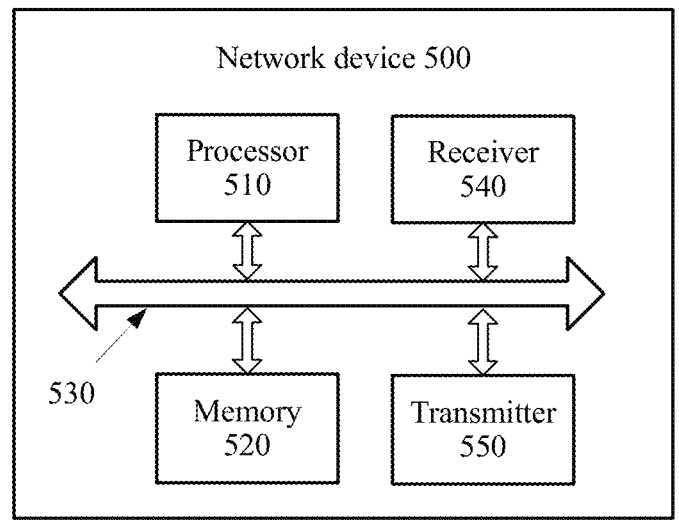
FIG. 7 is still another schematic block diagram of a network device according to an embodiment of this application.

As shown in FIG. 7, an embodiment of this application further provides a network device 500, and the network device 500 includes a processor 510, a memory 520, a bus system 530, a receiver 540, and a transmitter 550. The processor 510, the memory 520, the receiver 540, and the transmitter 550 are connected to each other using the bus system 530. The memory 520 is configured to store an instruction. The processor 510 is configured to execute the instruction stored in the memory 520, to control the receiver 540 to receive a signal and control the transmitter 550 to send a signal. The receiver 540 and the transmitter 550 are configured to transmit a service packet to a second network device using a first binding tunnel, where the first binding tunnel includes a first tunnel and a second tunnel. The receiver 540 and the transmitter 550 are configured to: when the first tunnel is faulty or transmission quality of the first tunnel does not meet a preset condition, transmit a service packet to the second network device using a second binding tunnel, where the second binding tunnel includes a backup tunnel of the first tunnel and the second tunnel.

In this embodiment of this application, a backup tunnel of an original binding tunnel is set up. Therefore, when a tunnel in the original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

Optionally, in this embodiment of this application, the receiver 540 is configured to: before transmitting a service packet to the second network device using the second binding tunnel, receive a control packet sent by the second network device, where the control packet is used to indicate a destination IP address of the backup tunnel, and the destination IP address of the backup tunnel is an IP address of a tunnel port of a third network device.

The processor 510 is configured to set up the backup tunnel with the third network device based on the control packet.

Optionally, in this embodiment of this application, the transmitter 550 is configured to send a request packet to the second network device, where the request packet is used to set up the first tunnel, the request packet includes a source IP address of the first tunnel, and the source IP address of the first tunnel is an IP address of a tunnel port of the network device 500.

The receiver 540 is configured to receive a response packet sent by the second network device based on the request packet, where the response packet includes a destination IP address of the first tunnel and the destination IP address of the backup tunnel, the destination IP address of the first tunnel is an IP address of a tunnel port of the second network device, and the destination IP address of the backup tunnel is different from the destination IP address of the first tunnel.

Optionally, in this embodiment of this application, the request packet is a GRE setup request packet, the response packet is a GRE setup accept packet, the GRE setup accept packet includes an attribute-value pair AVP attribute field, and the AVP attribute field is used to indicate the destination IP address of the backup tunnel.

Optionally, in this embodiment of this application, the third network device is the second network device.

Optionally, in this embodiment of this application, the third network device is a network device other than the second network device, and there is a third tunnel between the third network device and the second network device.

The receiver 540 and the transmitter 550 are configured to transmit a service packet to the second network device using the second binding tunnel and the third tunnel.

Optionally, in this embodiment of this application, the transmitter 550 is configured to: before transmitting a service packet to the second network device using the second binding tunnel, send a first notification packet to the second network device, where the first notify packet is used to instruct to switch the first tunnel to the backup tunnel.

Optionally, in this embodiment of this application, the first notify packet is a GRE notify packet, the GRE notify packet includes an attribute-value pair AVP attribute field, and the AVP attribute field is used to instruct to switch the first tunnel to the backup tunnel of the first tunnel.

Optionally, in this embodiment of this application, the transmitter 550 is configured to: before transmitting a service packet to the second network device using the second binding tunnel, send a first notify packet to the second network device, where the first notify packet is used to instruct to switch the first tunnel to the backup tunnel.

The receiver 540 and the transmitter 550 are configured to transmit a service packet to the second network device using the first binding tunnel.

Optionally, in this embodiment of this application, the second notify packet is a GRE notify packet, the GRE notify packet includes an attribute-value pair AVP attribute field, and the AVP attribute field is used to instruct to switch the backup tunnel to the first tunnel.

Optionally, in this embodiment of this application, the network device 500 is a home gateway, and the second network device is a hybrid access aggregation point.

It should be understood that, in this embodiment of this application, the processor 510 may be a central processing unit (CPU), or the processor 510 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 520 may include a read-only memory and a random access memory, and provide an instruction and data for the processor 510. A part of the memory 520 may further include a nonvolatile random access memory. For example, the memory 520 may further store information about a device type.

In addition to a data bus, the bus system 530 may include a power bus, a control bus, a status signal bus, and the like. However, for clarity of description, various buses are marked as the bus system 530 in the figure.

In an implementation process, the steps of the foregoing methods may be completed using an integrated logic circuit of hardware in the processor 510 or an instruction in a form of software. The steps of the methods disclosed in the embodiments of this application may be directly performed by a hardware processor, or may be performed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520. The processor 510 reads information from the memory 520, and completes the steps of the foregoing methods using hardware of the processor 510. To avoid repetition, details are not described herein again.

It should be understood that the network device 500 in this embodiment of this application may be corresponding to the first network device in the tunnel binding based communication method in the embodiments of this application, and may be corresponding to the network device 300 in the embodiments of this application. In addition, the foregoing and other operations and/or functions of the modules of the network device 500 are separately used to implement corresponding procedures of the methods in FIG. 2 to FIG. 4. For brevity, details are not described herein again.

Figure 8:
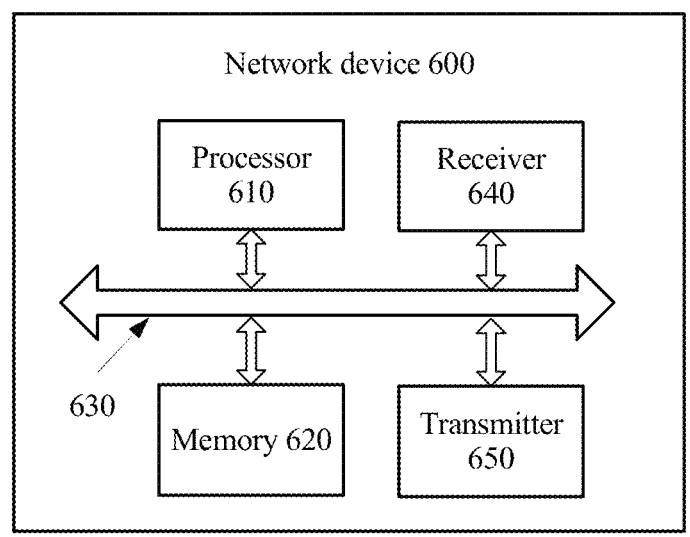
FIG. 8 is still another schematic block diagram of a network device according to an embodiment of this application.

As shown in FIG. 8, an embodiment of this application further provides a network device 600, and the network device 600 includes a processor 610, a memory 620, a bus system 630, a receiver 640, and a transmitter 650. The processor 610, the memory 620, the receiver 640, and the transmitter 650 are connected to each other using the bus system 630. The memory 620 is configured to store an instruction. The processor 610 is configured to execute the instruction stored in the memory 620, to control the receiver 640 to receive a signal and control the transmitter 650 to send a signal. The receiver 640 and the transmitter 650 are configured to transmit a service packet to a first network device using a first binding tunnel, where the first binding tunnel includes a first tunnel and a second tunnel. The receiver 640 is configured to: when the first tunnel is faulty or transmission quality of the first tunnel does not meet a preset condition, receive a first notify packet sent by the first network device, where the first notify packet is used to instruct to switch the first tunnel to a backup tunnel of the first tunnel. The receiver 640 and the transmitter 650 are configured to transmit a service packet to the first network device based on the first notify packet using a second binding tunnel, where the second binding tunnel includes the backup tunnel and the second tunnel.

In this embodiment of this application, a backup tunnel of an original binding tunnel is set up. Therefore, when a tunnel in the original binding tunnel is faulty, a tunnel binding based high-bandwidth service continues to be provided using another binding tunnel constituted by a backup tunnel of the faulty tunnel and a fault-free tunnel. Therefore, compared with the prior art, this application can improve high-bandwidth communication reliability and user satisfaction.

Optionally, in this embodiment of this application, the transmitter 650 is configured to send a control packet to the first network device, where the control packet is used to indicate a destination IP address of the backup tunnel, and the destination IP address of the backup tunnel is an IP address of a tunnel port of a third network device, so that the first network device sets up the backup tunnel with the third network device.

Optionally, in this embodiment of this application, the receiver 640 is configured to receive a request packet sent by the first network device, where the request packet is used to set up the first tunnel, the request packet includes a source IP address of the first tunnel, and the source IP address of the first tunnel is an IP address of a tunnel port of the first network device.

The transmitter 650 is configured to send a response packet to the first network device based on the request packet, where the response packet includes a destination IP address of the first tunnel, the destination IP address of the backup tunnel, and a session identifier, the destination IP address of the first tunnel is an IP address of a tunnel port of the network device, the destination IP address of the backup tunnel is different from the destination IP address of the first tunnel, and the session identifier is used to bind the first tunnel, the second tunnel, and the backup tunnel.

Optionally, in this embodiment of this application, the request packet is a GRE setup request packet, the response packet is a GRE setup accept packet, the GRE setup accept packet includes an attribute-value pair AVP attribute field, and the AVP attribute field is used to indicate the destination IP address of the backup tunnel.

Optionally, in this embodiment of this application, the third network device is the network device 600.

Optionally, in this embodiment of this application, the third network device is a network device other than the network device 600, and there is a third tunnel between the third network device and the network device 600.

The receiver 640 and the transmitter 650 are configured to transmit a service packet to the first network device using the second binding tunnel and the third tunnel.

Optionally, in this embodiment of this application, the receiver 640 is configured to receive, using the second tunnel, a first service packet sent by the first network device.

The receiver 640 is configured to receive, using the third tunnel, a second service packet sent by the third network device, where the second service packet is a service packet that is sent by the first network device and that is received by the third network device using the backup tunnel.

The processor 610 is configured to perform reordering processing on the first service packet and the second service packet.

Optionally, in this embodiment of this application, the first notify packet is a GRE notify packet, the GRE notify packet includes an attribute-value pair AVP attribute field, and the AVP attribute field is used to instruct to switch the first tunnel to the backup tunnel of the first tunnel.

Optionally, in this embodiment of this application, the receiver 640 is configured to: when the transmission quality of the first tunnel meets the preset condition, receive a second notify packet sent by the first network device, where the second notify packet is used to instruct to switch the backup tunnel to the first tunnel.

The receiver 640 and the transmitter 650 are configured to transmit a service packet to the first network device based on the second notify packet using the first binding tunnel again.

Optionally, in this embodiment of this application, the second notify packet is a GRE notify packet, the GRE notify packet includes an attribute-value pair AVP attribute field, and the AVP attribute field is used to instruct to switch the backup tunnel to the first tunnel.

Optionally, in this embodiment of this application, the network device 600 is a hybrid access aggregation point, and the first network device is a home gateway.

It should be understood that, in this embodiment of this application, the processor 610 may be a central processing unit (CPU), or the processor 610 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 620 may include a read-only memory and a random access memory, and provide an instruction and data for the processor 610. A part of the memory 620 may further include a nonvolatile random access memory. For example, the memory 620 may further store information about a device type.

In addition to a data bus, the bus system 630 may include a power bus, a control bus, a status signal bus, and the like. However, for clarity of description, various buses are marked as the bus system 630 in the figure.

In an implementation process, the steps of the foregoing methods may be completed using an integrated logic circuit of hardware in the processor 610 or an instruction in a form of software. The steps of the methods disclosed in the embodiments of this application may be directly performed by a hardware processor, or may be performed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 620. The processor 610 reads information from the memory 620, and completes the steps of the foregoing methods using hardware of the processor 610. To avoid repetition, details are not described herein again.

It should be understood that the network device 600 in this embodiment of this application may be corresponding to the second network device in the tunnel binding based communication method in the embodiments of this application, and may be corresponding to the network device 400 in the embodiments of this application. In addition, the foregoing and other operations and/or functions of the modules of the network device 600 are separately used to implement corresponding procedures of the methods in FIG. 2 to FIG. 4. For brevity, details are not described herein again.

Figure 9:
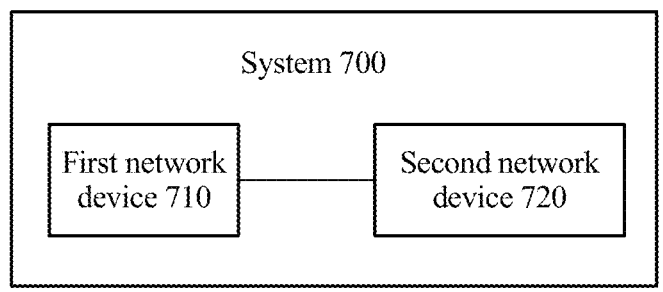
FIG. 9 is a schematic block diagram of a tunnel binding based system according to an embodiment of this application.

As shown in FIG. 9, an embodiment of this application further provides a tunnel binding based system 700. The system 700 includes a first network device 710 and a second network device 720. The first network device 710 is corresponding to the network device 300 in the embodiments of this application, and the second network device 720 is corresponding to the network device 400 in the embodiments of this application.

It should be further understood that various numerical symbols in this specification are differentiated merely for ease of description, but are not used to limit the scope of the embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A tunnel binding based communication method, comprising:
    transmitting, by a first network device, a service packet to a second network device using a first binding tunnel, wherein the first binding tunnel comprises a first tunnel and a second tunnel; and
    transmitting, by the first network device, the service packet to the second network device using a second binding tunnel when the first tunnel is faulty or a transmission quality of the first tunnel does not meet a preset condition, wherein the second binding tunnel comprises a backup tunnel of the first tunnel and the second tunnel.

2. The tunnel binding based communication method of claim 1, wherein before transmitting the service packet to the second network device using the second binding tunnel, the tunnel binding based communication method further comprises:
    receiving, by the first network device, a control packet from the second network device, wherein the control packet indicates a destination Internet Protocol (IP) address of the backup tunnel, and wherein the destination IP address of the backup tunnel is a third network device tunnel port; and
    setting up, by the first network device, the backup tunnel with a third network device based on the control packet.

3. The tunnel binding based communication method of claim 2, wherein receiving the control packet from the second network device comprises:
    sending, by the first network device to the second network device, a request packet requesting the first tunnel to be set up, wherein the request packet comprises a source IP address of the first tunnel, and wherein the source IP address of the first tunnel is a first network device tunnel port; and
    receiving, by the first network device from the second network device, a response packet in response to the request packet, wherein the response packet comprises a destination IP address of the first tunnel and the destination IP address of the backup tunnel, wherein the destination IP address of the first tunnel is a second network device tunnel port, and wherein the destination IP address of the backup tunnel is different from the destination IP address of the first tunnel.

4. The tunnel binding based communication method of claim 3, wherein the request packet is a Generic Routing Encapsulation (GRE) tunnel setup request packet, wherein the response packet is a GRE tunnel setup accept packet, and wherein the request packet comprises an attribute-value pair (AVP) attribute field configured to indicate the destination IP address of the backup tunnel.

5. The tunnel binding based communication method of claim 1, wherein before transmitting the service packet to the second network device using the second tunnel, the tunnel binding based communication method comprises sending, by the first network device to the second network device, a first notify packet instructing a switch from the first tunnel to the backup tunnel.

6. The tunnel binding based communication method of claim 1, further comprising:
    sending, by the first network device to the second network device, a second notify packet instructing a switch from the backup tunnel to the first tunnel when the transmission quality of the first tunnel meets the preset condition; and
    transmitting, by the first network device, the service packet to the second network device using the first tunnel again.

7. A network device, comprising:
    a processor; and
    a memory in communication with the processor and comprising instructions which, when executed by the processor, cause the network device to:
        transmit a service packet to a second network device using a first tunnel, wherein the first tunnel comprises a first tunnel and a second tunnel; and transmit the service packet to the second network device using a second tunnel when the first tunnel is faulty or a transmission quality of the first tunnel does not meet a preset condition, wherein the second binding tunnel comprises a backup tunnel of the first tunnel and the second tunnel.

8. The network device of claim 7, wherein the instructions further cause the network device to:
receive a control packet from the second network device before the service packet is transmitted to the second network device, wherein the control packet indicates a destination Internet Protocol (IP) address of the backup tunnel, and wherein the destination IP address of the backup tunnel is a third network device tunnel port; and
set up the backup tunnel with a third network device based on the control packet.

9. The network device of claim 8, wherein the instructions further cause the network device to:
send, to the second network device, a request packet requesting the first tunnel be set up, wherein the request packet comprises a source IP address of the first tunnel, and wherein the source IP address of the first tunnel is a network device tunnel port; and
receive a response packet from the second network device based on the request packet, wherein the response packet comprises a destination IP address of the first tunnel and the destination IP address of the backup tunnel, wherein the destination IP address of the first tunnel is second network device tunnel port, and wherein the destination IP address of the backup tunnel is different from the destination IP address of the first tunnel.

10. The network device of claim 9, wherein the request packet is a Generic Routing Encapsulation (GRE) tunnel setup request packet, wherein the response packet is a GRE tunnel setup accept packet, and wherein the GRE tunnel setup accept packet comprises an attribute-value pair (AVP) attribute field configured to indicate the destination IP address of the backup tunnel.

11. The network device of claim 7, wherein the instructions further cause the network device to send a first notify packet to the second network device before the service packet is transmitted to the second network device using the second binding tunnel, wherein the first notify packet instructs a switch from the first tunnel to the backup tunnel.

12. The network device of claim 11, wherein the first notify packet is a Generic Routing Encapsulation (GRE) notify packet comprising an attribute-value pair (AVP) attribute field instructing a switch from the first tunnel to the backup tunnel.

13. A network device, comprising:
a processor; and
a memory in communication with the processor and comprising instructions which, when executed by the processor, cause the network device to:
transmit a service packet to a first network device using a first binding tunnel, wherein the first binding tunnel comprises a first tunnel and a second tunnel,
receive a first notify packet from the first network device when the first tunnel is faulty or a transmission quality of the first tunnel does not meet a preset condition, wherein the first notify packet is used to instruct a switch from the first tunnel to a backup tunnel of the first tunnel, and
transmit, using a second binding tunnel, the service packet to the first network device based on the first notify packet, wherein the second binding tunnel comprises the backup tunnel and the second tunnel.

14. The network device of claim 13, wherein the instructions further cause the network device to send a control packet to the first network device before the service packet is transmitted to the first network device using the second binding tunnel, wherein the control packet indicates a destination Internet Protocol (IP) address of the backup tunnel, and wherein the destination IP address of the backup tunnel is a third network device tunnel port.

15. The network device of claim 14, wherein the instructions further cause the network device to:
receive a request packet from the first network device, wherein the request packet is used to set up the first tunnel, wherein the request packet comprises a source IP address of the first tunnel, and wherein the source IP address of the first tunnel is first-network device tunnel port; and
send a response packet to the first network device based on the request packet, wherein the response packet comprises a destination IP address of the first tunnel and the destination IP address of the backup tunnel, wherein the destination IP address of the first tunnel is a network device tunnel port, and wherein the destination IP address of the backup tunnel is different from the destination IP address of the first tunnel.

16. The network device of claim 15, wherein the request packet is a Generic Routing Encapsulation (GRE) setup request packet, wherein the response packet is a GRE setup accept packet, and wherein the response packet comprises an attribute-value pair (AVP) attribute field configured to indicate the destination IP address of the backup tunnel.

17. The network device of claim 14, wherein a third network device is the network device.

18. The network device of claim 13, wherein the first notify packet is a Generic Routing Encapsulation (GRE) notify packet comprising an attribute-value pair (AVP) attribute field for instructing to switch the first tunnel to the backup tunnel of the first tunnel.

19. The network device of claim 13, wherein the instructions further cause the network device to:
receive a second notify packet from the first network device when the transmission quality of the first tunnel meets the preset condition, wherein the second notify packet instructs a switch from the backup tunnel to the first tunnel; and
transmit the service packet to the first network device based on the second notify packet using the first binding tunnel again.

20. The network device of claim 19, wherein the second notify packet is a GRE notify packet comprising an attribute-value pair (AVP) attribute field that instructs a switch from the backup tunnel to the first tunnel.

* * * * *